US010525542B2

United States Patent
Kopton

(10) Patent No.: US 10,525,542 B2
(45) Date of Patent: Jan. 7, 2020

(54) TOOL FOR PRODUCING AN INTERNAL THREAD IN A WORKPIECE PILOT HOLE

(71) Applicant: AUDI AG, Ingolstadt (DE)

(72) Inventor: Peter Kopton, Kösching (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/323,856

(22) PCT Filed: Jul. 10, 2017

(86) PCT No.: PCT/EP2017/000808
§ 371 (c)(1),
(2) Date: Feb. 7, 2019

(87) PCT Pub. No.: WO2018/028810
PCT Pub. Date: Feb. 15, 2018

(65) Prior Publication Data
US 2019/0176255 A1 Jun. 13, 2019

(30) Foreign Application Priority Data
Aug. 10, 2016 (DE) .......................... 10 2016 009 738

(51) Int. Cl.
*B23G 7/02* (2006.01)
*B23G 5/20* (2006.01)
*B23B 51/06* (2006.01)

(52) U.S. Cl.
CPC ............... *B23G 7/02* (2013.01); *B23G 5/20* (2013.01); *B23B 51/06* (2013.01);
(Continued)

(58) Field of Classification Search
CPC ...... B23G 5/20; B23G 7/02; B23G 2200/142; B23G 2200/143; B23G 2240/12; B23B 2251/082; B23B 51/06
See application file for complete search history.

(56) References Cited

U.S. PATENT DOCUMENTS

| | | | |
|---|---|---|---|
| 395,909 A * | 1/1889 | Langlands et al. ...... | B23G 5/06 408/222 |
| 1,475,561 A | 11/1923 | Bath | |

(Continued)

FOREIGN PATENT DOCUMENTS

| CN | 2136094 Y | 6/1993 |
|---|---|---|
| CN | 1159777 A | 9/1997 |

(Continued)

OTHER PUBLICATIONS

Examination Report dated Nov. 15, 2017 of corresponding German application No. 10 2016 009 738.8; 12 pages.

(Continued)

*Primary Examiner* — Eric A. Gates
(74) *Attorney, Agent, or Firm* — Maier & Maier, PLLC

(57) ABSTRACT

A tool for producing an internal thread in a workpiece pilot hole having a thread major diameter and a thread minor diameter, which tool has a thread-forming section, by which an internal thread profile can be produced in a pilot hole wall. The internal thread profile having the thread major diameter and a thread inner diameter. The tool has a drilling section, by which the thread inner diameter of the internal thread profile can be expanded to the thread minor diameter by machining. At least one, in particular exactly one chip groove is associated with the drilling section of the tool, by which chip groove the chips produced as the thread inner diameter is expanded to the thread minor diameter can be transported away.

14 Claims, 12 Drawing Sheets

(52) U.S. Cl.
CPC .. *B23B 2251/082* (2013.01); *B23G 2200/142* (2013.01); *B23G 2200/143* (2013.01); *B23G 2210/04* (2013.01); *B23G 2240/12* (2013.01); *Y10T 408/455* (2015.01)

(56) References Cited

U.S. PATENT DOCUMENTS

| | | | | |
|---|---|---|---|---|
| 1,826,323 | A * | 10/1931 | Mueller | B23G 5/20 408/219 |
| 2,029,514 | A * | 2/1936 | Thomson | B23G 5/06 408/217 |
| 2,735,116 | A * | 2/1956 | Mueller | B23G 5/20 408/218 |
| 3,097,426 | A | 7/1963 | Hill | |
| 3,258,797 | A * | 7/1966 | Budd | B21H 3/10 470/204 |
| 4,271,554 | A * | 6/1981 | Grenell | B23G 5/20 408/220 |
| 4,761,844 | A * | 8/1988 | Turchan | B23G 1/34 408/222 |
| 4,831,674 | A * | 5/1989 | Bergstrom | B23G 1/34 408/222 |
| 5,413,438 | A * | 5/1995 | Turchan | B23G 1/34 408/222 |
| 5,678,962 | A | 10/1997 | Hyatt et al. | |
| 5,733,078 | A * | 3/1998 | Matsushita | B23G 5/182 409/74 |
| 6,012,882 | A * | 1/2000 | Turchan | B23G 5/188 408/222 |
| 6,499,920 | B2 | 12/2002 | Sawabe | |
| 7,419,339 | B2 | 9/2008 | Glimpel et al. | |
| 8,794,879 | B2 | 8/2014 | Durst | |
| 2010/0092255 | A1* | 4/2010 | Owusu | H01T 13/08 408/199 |
| 2013/0336738 | A1 | 12/2013 | Glimpel et al. | |
| 2019/0168324 | A1* | 6/2019 | Kopton | B23G 5/20 |

FOREIGN PATENT DOCUMENTS

| | | | |
|---|---|---|---|
| CN | 1836813 A | 9/2006 | |
| CN | 101927382 A | 12/2010 | |
| CN | 102333610 A | 1/2012 | |
| CN | 202147066 U | 2/2012 | |
| CN | 102990171 A | 3/2013 | |
| CN | 203171099 U | 9/2013 | |
| DE | 2 058 991 A1 | 6/1972 | |
| DE | 79 22 782 U1 | 11/1979 | |
| DE | 28 52 906 A1 | 6/1980 | |
| DE | 3934907 A1 * | 4/1991 | B23G 5/184 |
| DE | 696 21 092 T2 | 1/2003 | |
| DE | 10 2005 022503 A1 | 3/2006 | |
| EP | 0 767024 A1 | 4/1997 | |
| EP | 0 780 182 A1 | 6/1997 | |
| GB | 2 335 878 A | 10/1999 | |
| JP | 2012071405 A | 4/2012 | |

OTHER PUBLICATIONS

International Search Report and Written Opinion of the International Searching Authority dated Oct. 5, 2017 in corresponding International application No. PCT/EP2017/000808; 32 pages.

International Preliminary Report on Patentability dated Jul. 19, 2018 in corresponding International application No. PCT/EP2017/000808; 24 pages.

International Preliminary Report on Patentability (Chapter II) dated Feb. 14, 2019, of corresponding International application No. PCT/EP2017/000808; 6 pages.

Office Action dated Jul. 18, 2019 in corresponding Chinese Application No. 201780049389.0; 11 pages including English-language translation.

Office Action dated Oct. 29, 2019, in corresponding Japanese Application No. 2019-507330; 6 pages.

* cited by examiner

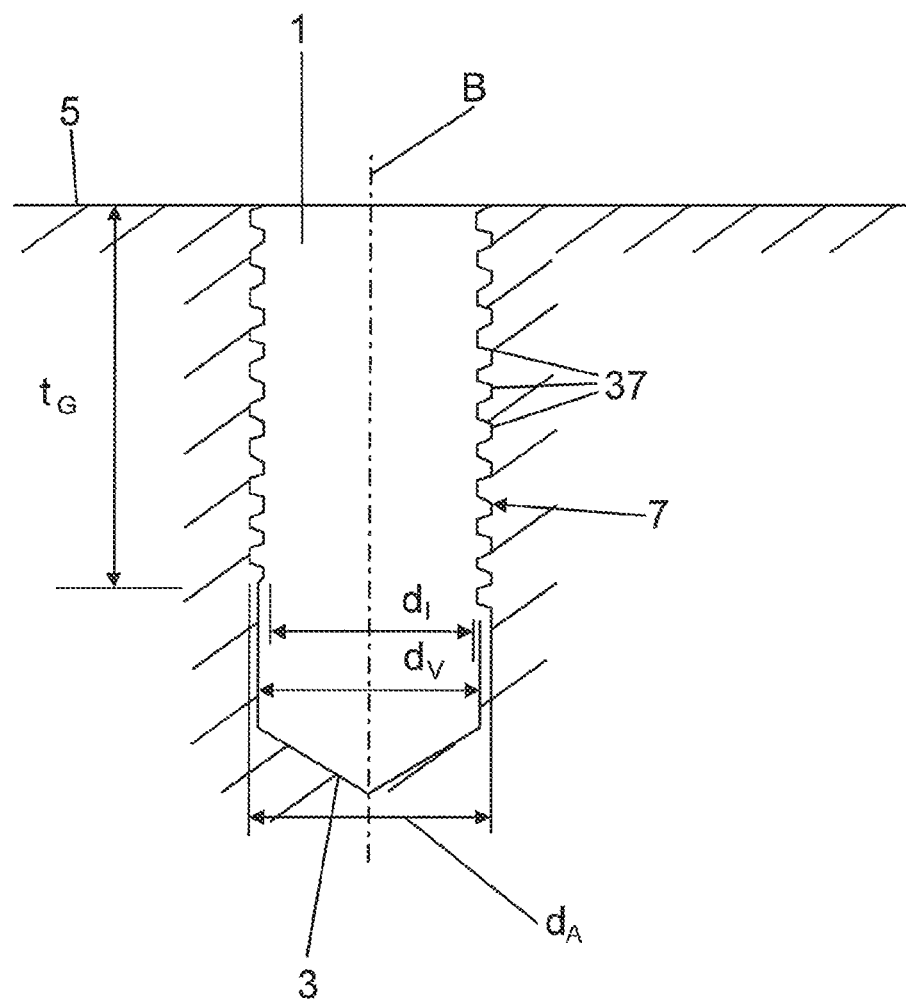

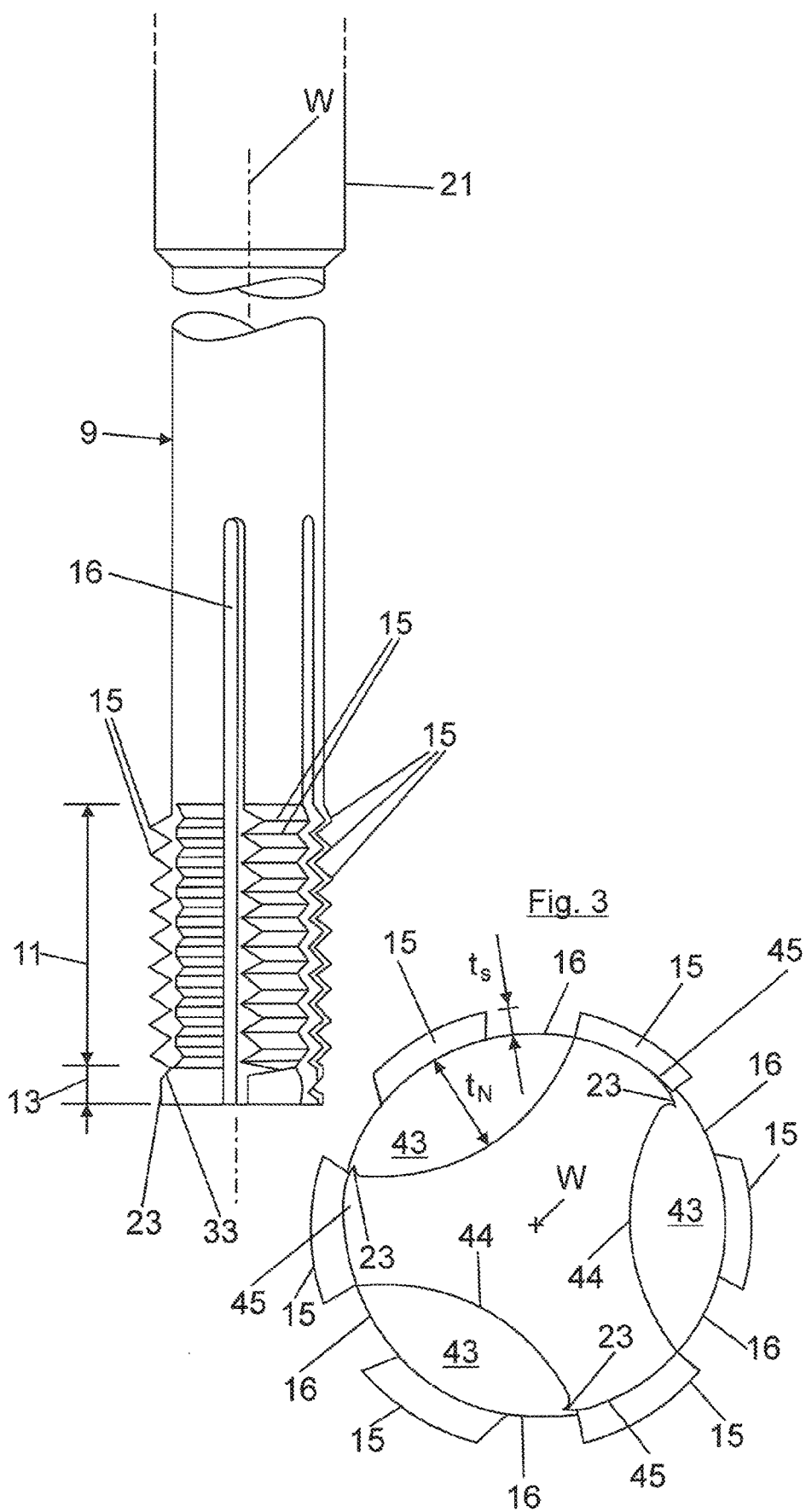

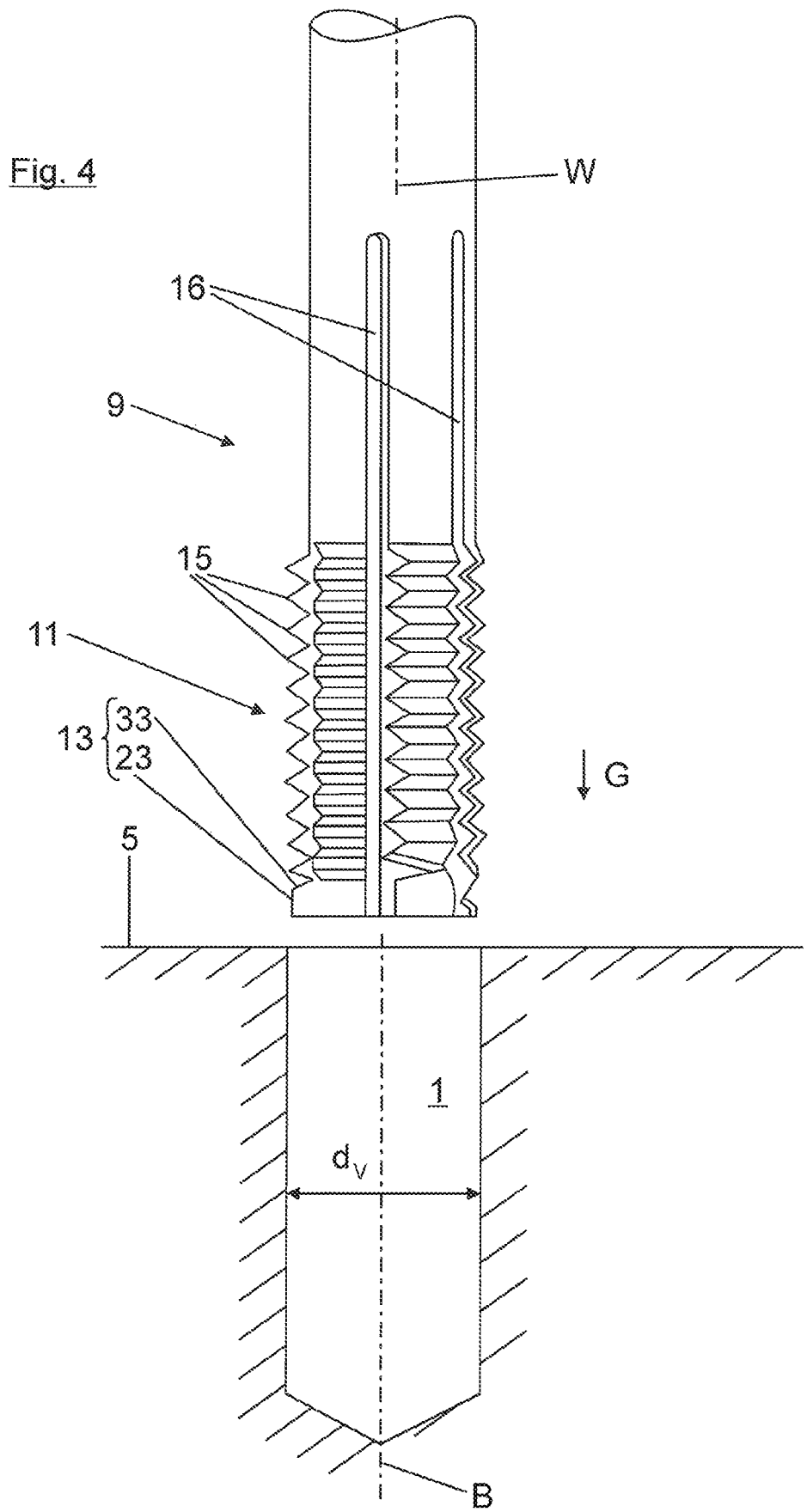

TOOL FOR PRODUCING AN INTERNAL THREAD IN A WORKPIECE PILOT HOLE

FIELD

The invention relates to a tool for producing an internal thread in a workpiece pilot hole.

BACKGROUND

In a workpiece pilot hole, an internal thread can be produced by thread cutting or by non-cutting thread shaping. In the process of non-cutting thread shaping, the workpiece material is plastically deformed on the pilot hole wall, thereby forming an internal thread.

A conventional method initially comprises providing a workpiece pilot hole in which an internal thread is produced by means of a thread producing tool (that is, a thread cutting or thread shaping tool), which internal thread comprises an thread major diameter and a thread minor diameter. In a first process step, the thread producing tool is introduced into the workpiece pilot hole in a thread producing stroke with a defined thread producing feed and a synchronized thread producing speed until it reaches a target thread depth, by which action the internal thread is formed. A reversing stroke in the opposite direction follows, in which the thread producing tool is moved out of the internal thread of the workpiece pilot hole, said stroke having a feed in the opposite direction and a synchronized reversing speed, such that the thread producing tool can be removed from the pilot hole along the pitch of the internal thread in substantially stress-free operation.

The internal thread shaped in this manner in the workpiece pilot hole has a radially outer thread base and a radially inner crest, which are spaced apart by one profile height in the radial direction of the hole. As a result of the plastic deformation of the workpiece material that specifically occurs in a non-cutting thread shaping process, defects or material weakenings can form in the shaped internal thread. These occur particularly on the radially inner crest of the internal thread and impair the setting behavior of a screw member screwed into the internal thread.

DE 2 058 991 discloses a thread shaping tool for forming internal threads which comprises a cutter head for precision machining or rough reaming a workpiece pilot hole, respectively. DE 79 22 782 U1 discloses a combined tool for drilling and thread shaping, which allows drilling and shaping a thread in a single operation.

DE 696 21 092 T2 discloses a thread producing tool of this generic type which is used to initially produce an internal thread profile on the pilot hole wall. The internal thread profile comprises the final thread major diameter as well as an thread inner diameter which is smaller than the thread minor diameter in the finished state of the internal thread. A final processing step follows in which the thread inner diameter of the internal thread profile is widened to the final thread minor diameter of the internal thread. The internal thread profile is widened by machining, for example by grinding or drilling, in which process the internal thread profile is ground or drilled to the thread minor diameter.

SUMMARY

It is the problem of the invention to provide a tool for producing an internal thread in a workpiece pilot hole which ensures a durably reliable screwed connection.

As explained above with respect to the prior art of this generic type, the thread producing tool is first used, according to the invention, to produce an internal thread profile on the pilot hole wall. The internal thread profile comprises the final thread major diameter as well as an thread inner diameter which is smaller than the thread minor diameter in the finished state of the internal thread. A final processing step follows in which the thread inner diameter of the internal thread profile is expanded to the final thread minor diameter of the internal thread. The internal thread profile is expanded by machining, for example by grinding or drilling, in which process the internal thread profile is ground or drilled to the thread minor diameter.

It was found, however, that the chips produced during cutting can cause damage to the internal thread. According to the characterizing part of claim 1, at least one chip groove is therefore associated with the drilling section of the tool, by means of which the chips produced when the thread inner diameter is expanded to the thread minor diameter can be transported away. In general, one or multiple chip grooves can be formed in the tool. But when considering the mechanical tensions that act on the tool during processing, it is particularly preferred that exactly one chip groove is formed in the tool to ensure its component stability. The chip groove can extend linearly or helically along the tool axis across one groove length. The chip groove can preferably extend through the thread shaping section and in addition be extended towards a tool clamping shaft.

The thread producing tool can preferably be an internal thread shaper in which the internal thread profile is formed on the pilot hole wall in a non-cutting thread shaping process, i.e. with minimal plastic deformation of the tool material. The following aspects of the invention are explained with reference to a non-cutting thread shaping process. However, the invention is not limited to such a non-cutting thread shaping process; it can instead be used for any thread producing processes.

The thread shaping tool can be introduced into the workpiece pilot hole, thereby forming an internal thread profile. The thread shaping feed and the thread shaping speed are adjusted to each other or synchronized to form the intended internal thread profile until a target thread depth is reached. A reversing stroke follows, in which the thread shaping tool is guided out of the internal thread profile of the pilot hole In the reversing stroke, the thread shaping tool is driven with a reverse feed in the opposite direction and a synchronized speed in the opposite direction. This ensures that a thread shaping section formed on the tool is substantially guided out through the pitch of the internal thread profile produced in the workpiece pilot hole in a substantially stress-free manner.

In the thread shaping process outlined above, a material weakening or material defect can form on the radially inner crest of the shaped internal thread profile, where molding bulges from the solid workpiece material project inwards and enclose a cavity. There may also be cracks in the crest. Such defects impair the setting behavior of a screwed-in screw member. Therefore, the material weakenings or defects formed on the crest are removed partially, preferably completely, in the final processing step.

The thread shaping tool can be configured in such a manner that the final processing step is either performed at the same time as the thread shaping stroke or at the same time as the reversing stroke. In this case, both a thread shaping section and a drilling or grinding section are integrated in the thread shaping tool. Alternatively, the final processing step can be performed using a separate grinding or drilling tool with which the internal thread profile can be expanded to the final thread minor diameter.

A thread shaping tool for performing the above method can preferably comprise a clamping shaft and an adjoining tool body. Along its axis, the tool can comprise a thread shaping section and a drilling or grinding section (hereinafter simply called drilling section). The thread shaping section is used to produce the internal thread profile in the pilot hole wall, which profile still has the thread inner diameter. The drilling section can be used to expand the thread inner diameter of the internal thread profile to the final thread minor diameter.

The thread shaping section can comprise at least one profile cog, which is configured with a radially inner profile cog crest and a radially inner profile cog base, the latter being spaced apart by a cog height from the profile cog crest. For performing the method according to the invention, the radially outer profile cog crest is located on a circular line whose diameter is greater than the pilot hole diameter. In addition, the radially inner profile cog base is located on a circular line whose diameter is smaller than the pilot hole diameter.

In a technical implementation, the thread shaping section can comprise circumferentially distributed profile cogs when viewed in a circumferential direction of the tool. According to established practice, these cogs are spaced apart by at least one lubricating groove extending in an axial direction. When the thread is shaped, a lubricant and coolant is supplied to the profile cogs to ensure flawless forming of the thread. The lubricating groove depth can be much smaller than the clamping groove depth when viewed in the radial direction. This ensures that, on the one hand, sufficient lubricant and/or coolant can be supplied to the profile cogs of the thread shaping section, and on the other hand, that the chips (small cross section) produced can flawlessly be transported away via the clamping groove which has a large cross section.

The drilling section formed on the thread shaping tool is used to drill the internal thread profile to the thread minor diameter. For this purpose, the drilling section can comprise at least one longitudinal cutter with a radially outer cutting edge which extends linearly or helically along the tool axis. The longitudinal cutting edge can be located on an edge diameter which is smaller than the pilot hole diameter but greater than the inner diameter of the internal thread profile.

In a preferred embodiment, the drilling section can be formed directly on the tool tip and transitions into the thread shaping section in the direction of the tool clamping shaft. In this case, the drilling section can be inserted stress-free into the as yet unprocessed workpiece pilot hole during the thread shaping stroke. In the subsequent reversing stroke, the internal thread profile is drilled to the thread minor diameter by means of the drilling section, which completes the internal thread.

In the above tool geometry, the longitudinal cutting edge can transition into a cross cutter that runs transversely to the tool axis at a cutting corner facing away from the tool tip. The drilling process is thus preferably performed using both the longitudinal and the cross cutters, such that the load of the longitudinal edge can be reduced.

In addition, it is preferred that the longitudinal cutting edge does not extend in a straight line between two cutting corners, but instead has a radially inward curvature. This allows deburring of the cut surface edges formed on the internal thread produced.

It is important for a flawless internal thread, on the one hand, that the material weakenings or defects formed on the internal thread crest when shaping the thread are completely removed in the final processing step. Removing this material reduces the internal thread profile height. On the other hand, it is important that the remaining internal thread profile height after removing the material is still sufficient to ensure a flawless screwed connection with a screw member.

Thus the following action can be taken: A pocket-shaped recess can be provided on the profile cog base of the thread shaping section on the tool side, which enlarges the displacement space available for workpiece material during thread shaping in a radially inward direction. This displacement space which is enlarged radially inwards moves the material weakenings/defects formed on the crest further radially inwards (while at the same time reducing the inner diameter of the internal thread profile). As a result, the material weakenings/defects can be completely removed in the final processing step on the one hand, and on the other hand a sufficient internal thread profile height remains to ensure a reliable screwed connection with the screw member.

In addition, the pilot hole diameter can be reduced—compared to conventional thread shaping methods. This means that additional workpiece material is plastically deformed and displaced in the thread shaping process.

The following action is preferred to ensure flawless chip removal from the pilot hole during the machining process: The chip groove on the drilling section of the tool can have an additional chip guiding step. It can at least partially close the chip groove in the axial direction. Chips produced in the machining process accumulate at the chip guiding step, which prevents chip transport towards the pilot hole base but supports chip transport out of the pilot hole.

In a technical implementation, the chip guiding step can be formed directly on the tool tip. The chip guiding step can be formed by reducing the chip groove depth to a reduced chip groove depth. The chip guiding step comprises a chip guiding surface, which merges with a radially outer tool clearance surface on the longitudinal cutter of the drilling section. In addition, the chip guiding surface can transition into an end face which forms the tool tip on an end-side transition edge. The end-side transition edge defines a free chip groove opening region which leads into the tool end face.

It is preferred that the tool is connected to a coolant system in the machining process. For this purpose, the tool can comprise a central cooling duct which extends from the tool clamping shaft towards the tool tip. The central cooling duct can be in fluid communication with an outlet duct which leads directly into the chip groove. This results in a coolant flow path along which the coolant is initially conducted to the tool tip and then exits in the opposite direction from an orifice in the outlet duct into the chip groove to support the chip discharge out of the pilot hole.

The fluid communication between the central cooling duct and the outlet duct can be achieved in a very simple manner when using the tool in a blind hole: In this case, both the central cooling duct and the outlet duct can lead to the tool end face. In this way, the fluid communication between the central cooling duct and the outlet duct is simply formed by a space between the tool tip and the base of the blind hole.

The advantageous embodiments and further developments of the invention explained above and/or in the dependent claims can be applied separately or in any combination—except for example in cases of unique constraints or incompatible alternatives.

BRIEF DESCRIPTION OF THE DRAWINGS

The invention and its advantageous further developments and their advantages will be explained in more detail below with reference to drawings.

Wherein:

FIG. 1 shows a partial sectional view of a workpiece pilot hole with an internal thread;

FIG. 2 shows a view of a thread shaping tool;

FIG. 3 shows another view of a thread shaping tool;

FIG. 4 shows a view which illustrates the process steps for producing the internal thread shown in FIG. 1;

DETAILED DESCRIPTION

Figure 5:
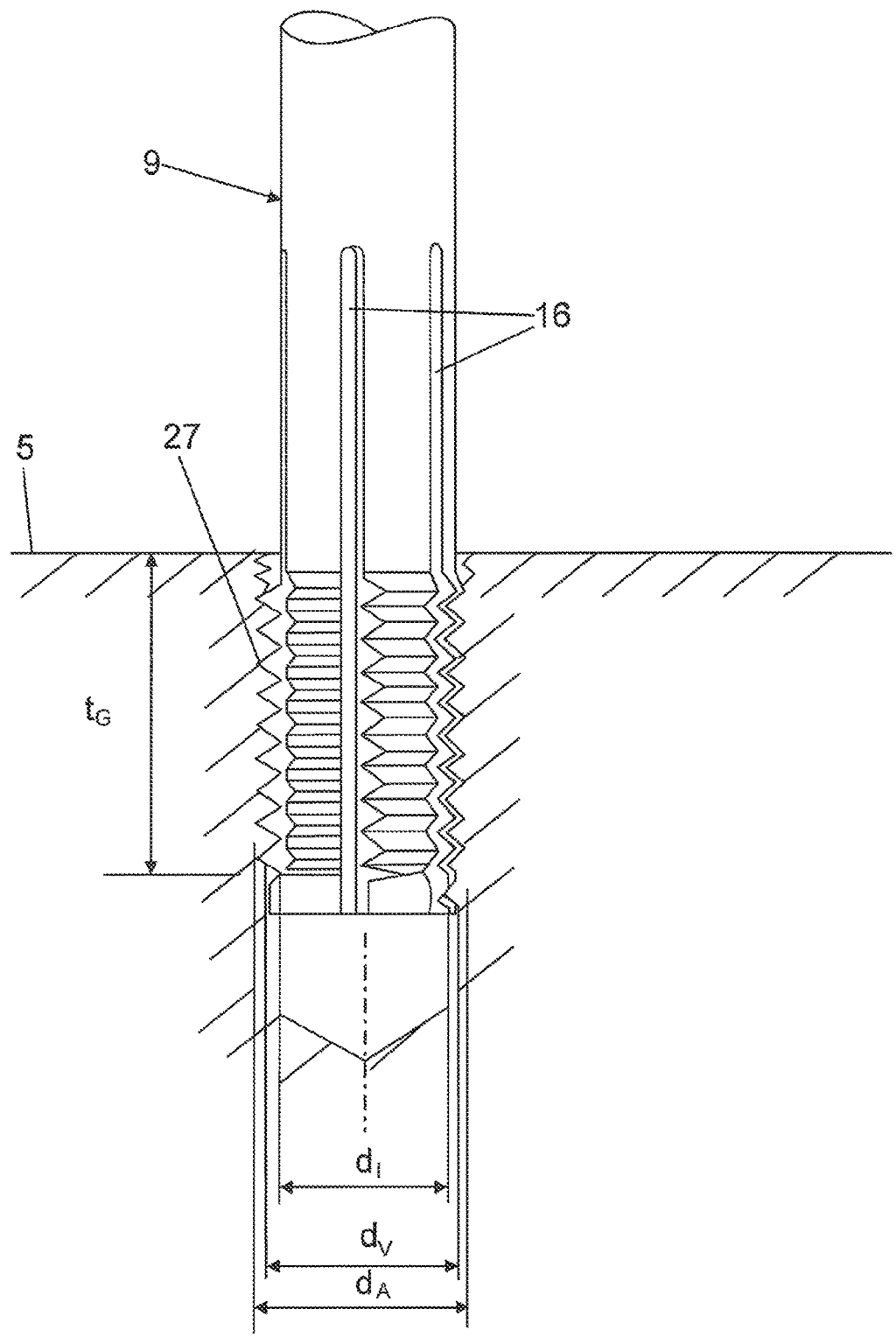
FIG. 5 shows a view which illustrates the process steps for producing the internal thread shown in FIG. 1.

FIG. 1 shows a finished threaded blind hole 1. The bottom 3 of the hole 1 is machined into a workpiece 5 to a target hole depth. In addition, the hole 1 comprises an internal thread 7 which extends along a hole axis B to a usable target thread depth $t_G$. The internal thread 7 has a thread major diameter $d_A$ and a thread minor diameter $d_K$.

The internal thread 7 shown in FIG. 1 is executed by means of the thread shaping tool 9 described below with reference to FIGS. 2 and 3. According to these, the tool 9 comprises a thread shaping section 11 and a drilling section 13, whose functions will be explained later. The thread shaping section 11 is implemented with a row of profile cogs 15, each of which comprising a radially outer profile cog crest 17 (FIG. 6) and radially inner profile cog base 19 (FIG. 6), which are spaced apart from each other by a cog height. The profile cog crest 17 is located in FIG. 6 on a circular line whose diameter ds is greater than a pilot hole diameter $d_V$ (FIG. 1 or FIG. 6) of a workpiece pilot hole 1 (FIG. 4). The profile cog base 19, on the contrary, is located on a circular line whose diameter $d_G$ is smaller than the pilot hole diameter $d_V$. The structure and geometry of the profile cogs 15 of the thread shaping section 11 are of conventional make and known from prior art.

Figure 6:
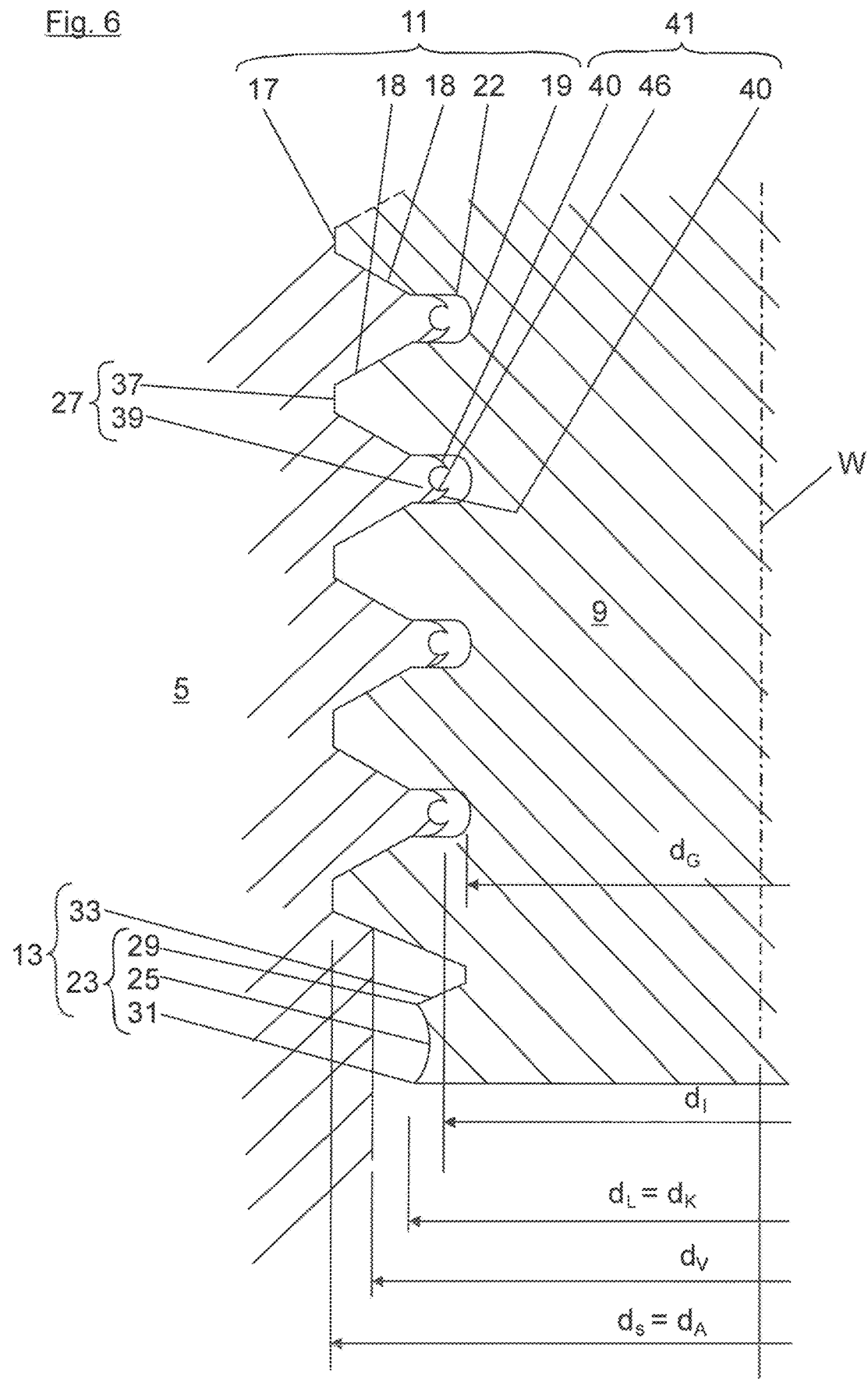
FIG. 6 shows a view which illustrates the process steps for producing the internal thread shown in FIG. 1.

According to FIG. 2, 4, or 6, the drilling section 13 is formed directly on the tool tip and extends from there towards a tool clamping shaft 21 (FIG. 1) to merge with the thread shaping section 11. In FIG. 3, the drilling section 13 comprises three longitudinal cutters 23, which are evenly distributed across the circumference. Each of the longitudinal cutters 23 has a longitudinal cutting edge 25 (FIG. 6) which is located on an edge diameter $d_L$ which is smaller than the pilot hole diameter $d_V$ and greater than the thread inner diameter $d_I$ of the internal thread profile 27 (FIG. 6) described below.

Figure 7:
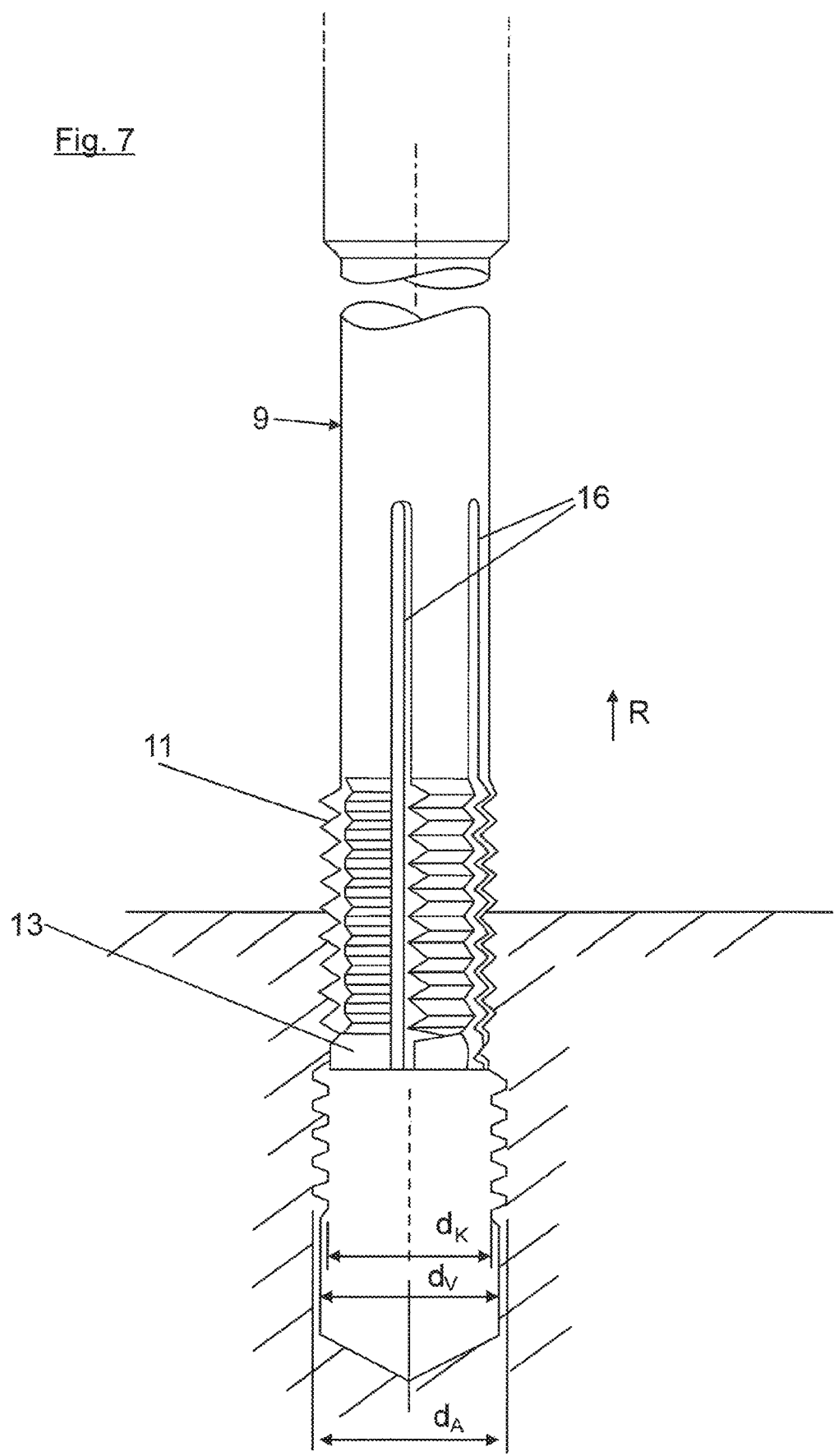
FIG. 7 shows a view which illustrates the process steps for producing the internal thread shown in FIG. 1.
Figure 8:
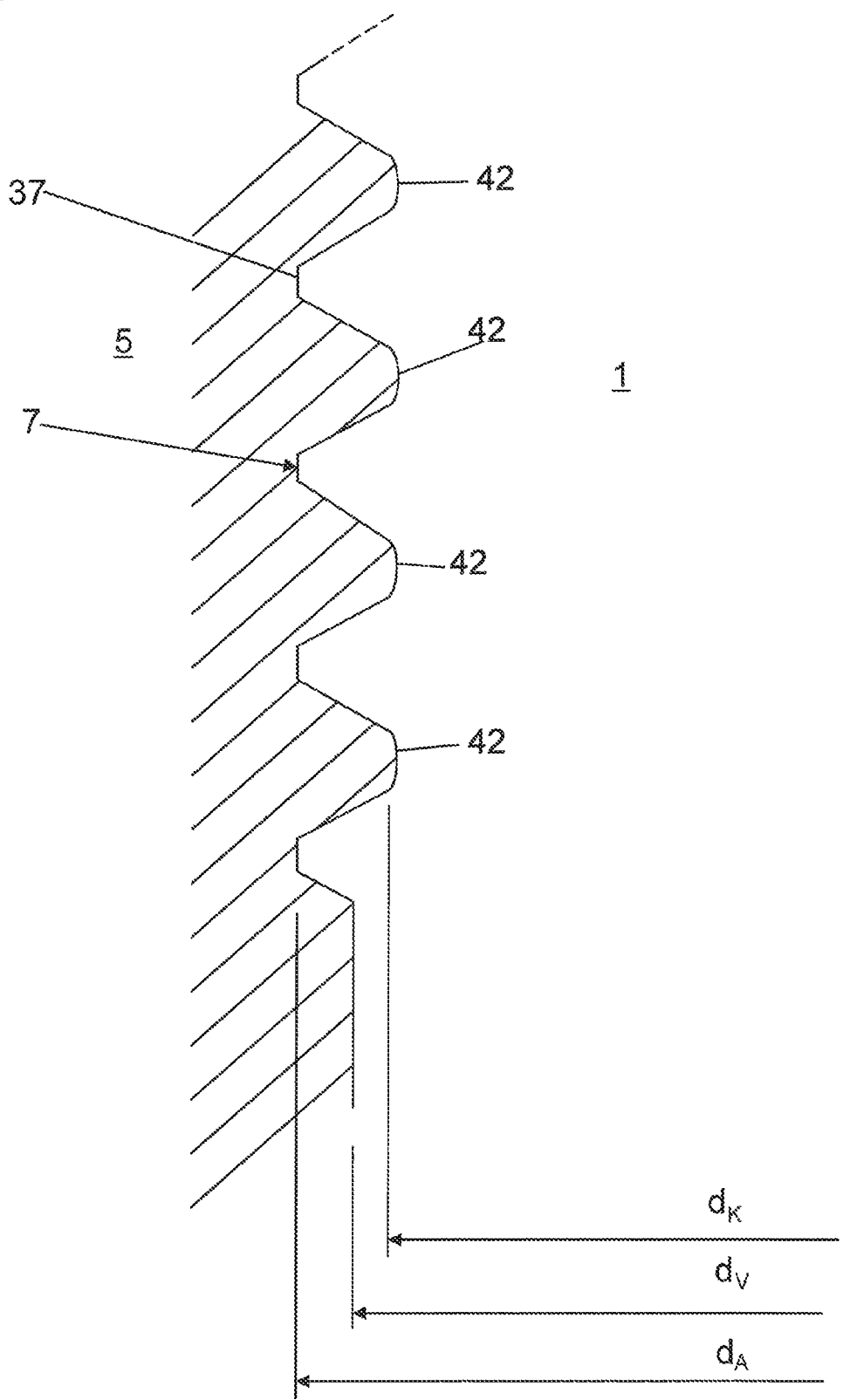
FIG. 8 shows a view which illustrates the process steps for producing the internal thread shown in FIG. 1.

As is visible in FIG. 7, the longitudinal cutting edge 25 extends along the tool axis W between two cutting corners 29, 31. The longitudinal cutting edge 25 has a radially inwardly bent profile; the effect of this edge geometry is described below. In addition the longitudinal cutting edge 25 transitions into a cross cutter 33 at the cutting corner 29 that faces away from the tool tip.

The method for producing the threaded blind hole 1 shown in FIG. 1 is described below with reference to FIGS. 4 to 8. Accordingly, in FIG. 4 the thread shaping tool 9 is inserted during a thread shaping stroke G into the workpiece pilot hole 1 until it reaches the target thread depth $t_g$ wherein the tool axis W is in coaxial alignment with the drilling axis B. In the thread shaping stroke G, the tool feed fg and a thread shaping speed $n_g$ are coordinated to each other, such that an internal thread profile 27 (FIG. 5 or FIG. 6) is formed. In FIG. 6, the internal thread 27 has a radially outer thread base 37 and a radially inner crest 39, which are spaced apart by one profile height in the radial direction. As is visible in FIG. 6, material weakenings or defects 41 with molding bulges 40 are formed on the crest 39 of the internal thread profile 27, which bulges project radially inwards from the solid tool material and enclose a cavity 46. During the above thread shaping stroke G, the drilling section 13 formed on the tool tip is inserted stress-free into the workpiece pilot hole 1.

In the subsequent reversing stroke R (FIG. 7), the thread shaping section 11 on the tool side is guided out of the pilot hole 1 stress-free along the pitch of the internal thread profile 35 by means of an opposing reversing feed $f_R$ and a synchronized opposing reversing speed $n_R$. The reversing stroke R includes a final processing step in which the drilling section 13 expands the thread inner diameter $d_I$ by drilling to the thread minor diameter $d_K$. Material removal is selected such that the defects 41 on the crest 39 are completely removed. The cut surface edges 42 (FIG. 8) on the machined crest 39 of the internal thread 7 can at the same time be deburred due to the radially inwardly bent profile of the longitudinal cutting edge 25 outlined in FIG. 6.

As is apparent from the above description, defects 41 form during the thread shaping stroke G directly on the radially inner crest 39 of the internal thread profile 27. According to FIG. 9, the following action is taken to ensure that the remaining internal thread profile height after the final processing step is sufficient: The pilot hole diameter $d_V$ is reduced compared to conventional thread shaping methods. This means that additional workpiece material is plastically deformed and displaced in the thread shaping process. In addition to the profile cog base 19 of the tool-side thread shaping section 11, pocket-shaped recess 22 (FIG. 6) is provided on the profile cog base of the thread shaping section on the tool side, which enlarges the displacement space available for workpiece material during thread shaping in a radially inward direction. This displacement space which is enlarged radially inwards moves the material weakenings/defects 41 formed on the crest 39 further radially inwards, while at the same time reducing the inner diameter $d_I$ of the internal thread profile 27. As a result, the material weakenings/defects 41 can be completely removed in the final processing step on the one hand, and on the other hand a sufficient internal thread profile height remains to ensure a reliable screwed connection with the screw member.

Figure 9:
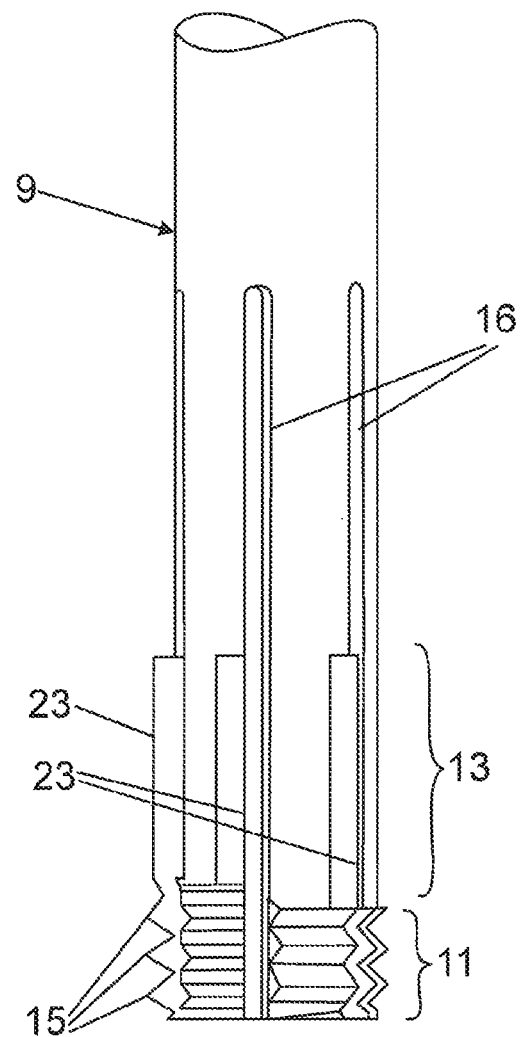
FIG. 9 shows a thread shaping tool according to a second embodiment.

FIG. 9 shows the thread shaping tool 9 according to a second embodiment. Unlike the preceding embodiment, the drilling section 13 in FIG. 9 is not formed directly at the tool tip, but offset from the tool tip at an axial spacing. The thread shaping section 11 extends up to the tool tip, however. In this way, it is not just the internal thread profile 27 that is formed in the thread shaping stroke G; at the same time, the drilling section 13 performs the final processing step in which the internal thread profile 27 produced by drilling to the thread minor diameter $d_K$.

Figure 10:
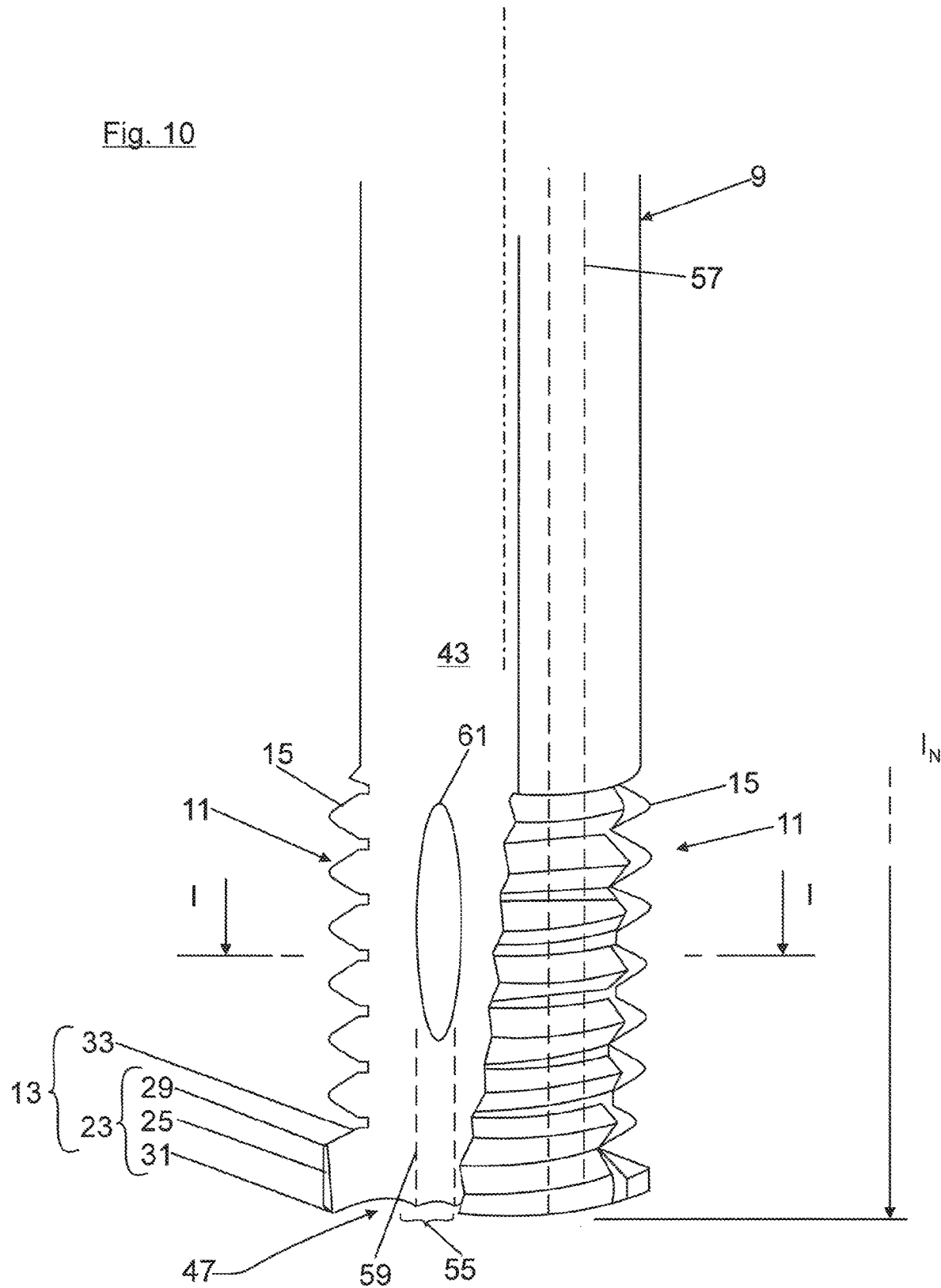
FIG. 10 shows a thread shaping tool according to a third embodiment.
Figure 11:
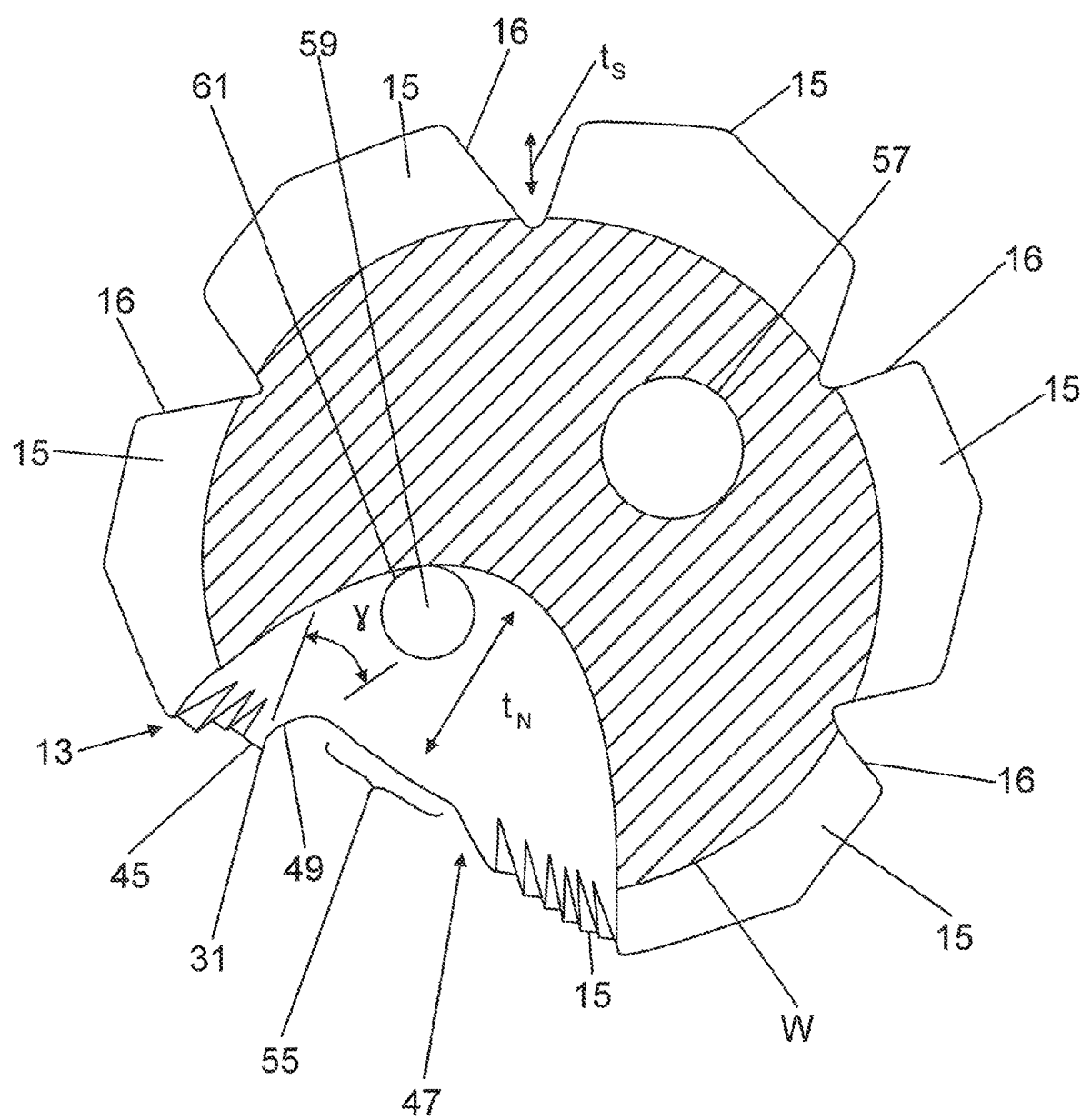
FIG. 11 shows a sectional view along section plane I-I from FIG. 10.
Figure 12:
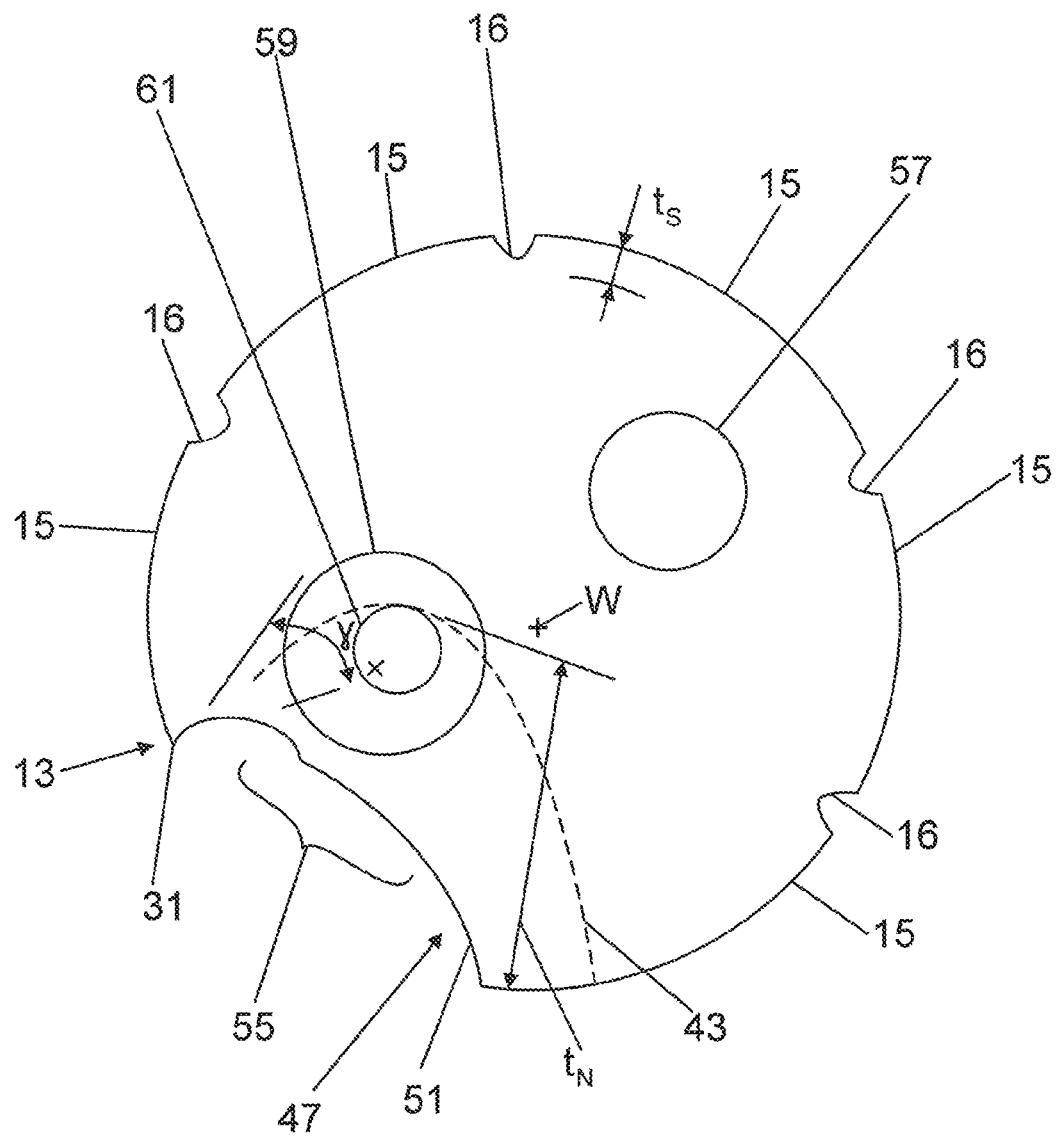
FIG. 12 shows a front view onto the tool tip of the thread shaping tool shown in FIG. 10.

FIG. 10 shows a thread shaping tool 9 according to a third embodiment, which is substantially of an identical construction as the thread shaping tool 9 according to the first embodiment as described in FIGS. 1 to 8. The thread shaping tool 9 comprises circumferentially distributed profile cogs 15 in the thread shaping section 13, as is also visible in FIG. 3. These cogs are spaced apart from each other by axially extending lubricating grooves 16. The lubricating grooves 16 extend linearly in the axial direction from the tool tip to the tool shaft 21 in the FIGS. 2 to 7 or in the FIGS. 11 and 12. Their lubricating groove depth $t_S$ (FIG. 2, 11, or 12) is dimensioned such that lubricant and/or coolant can reliably be supplied to the profile cogs 15 in the machining process to ensure sufficient lubricant and/or coolant supply to the profile cogs 15 while the thread is shaped. In addition to the lubricating grooves 16, the thread shaping tool 9 has a total of three chip grooves 43 in FIG. 3, which grooves are machined into the tool with a chip groove depth $t_N$. The chip groove depth $t_N$ is much greater dimensioned than the lubricating groove depth $t_S$. The chips produced when expanding the thread inner diameter $d_I$ to the thread minor diameter $d_K$ are transported out of the pilot hole 1 via the chip grooves 43.

In FIG. 3, each of the chip grooves 43 is defined by a chip surface 44, which merges with a radially outer tool clearance surface 45 at the longitudinal cutter 23 of the drilling section 13. The total of three circumferentially distributed chip grooves 43 shown in FIG. 3 extend in the axial direction at a much reduced groove length $l_N$ only between the tool tip and the thread shaping section 3, without passing axially through it.

Unlike that, just a single chip groove 43 is configured in the tool in the third embodiment of FIGS. 10 to 13. This groove extends linearly along the tool axis W and has a groove length $l_N$ such that it passes through the thread shaping section 3 and runs up to the tool clamping shaft 21. This results in a considerably improved chip discharge compared to the first embodiment.

Figure 13:
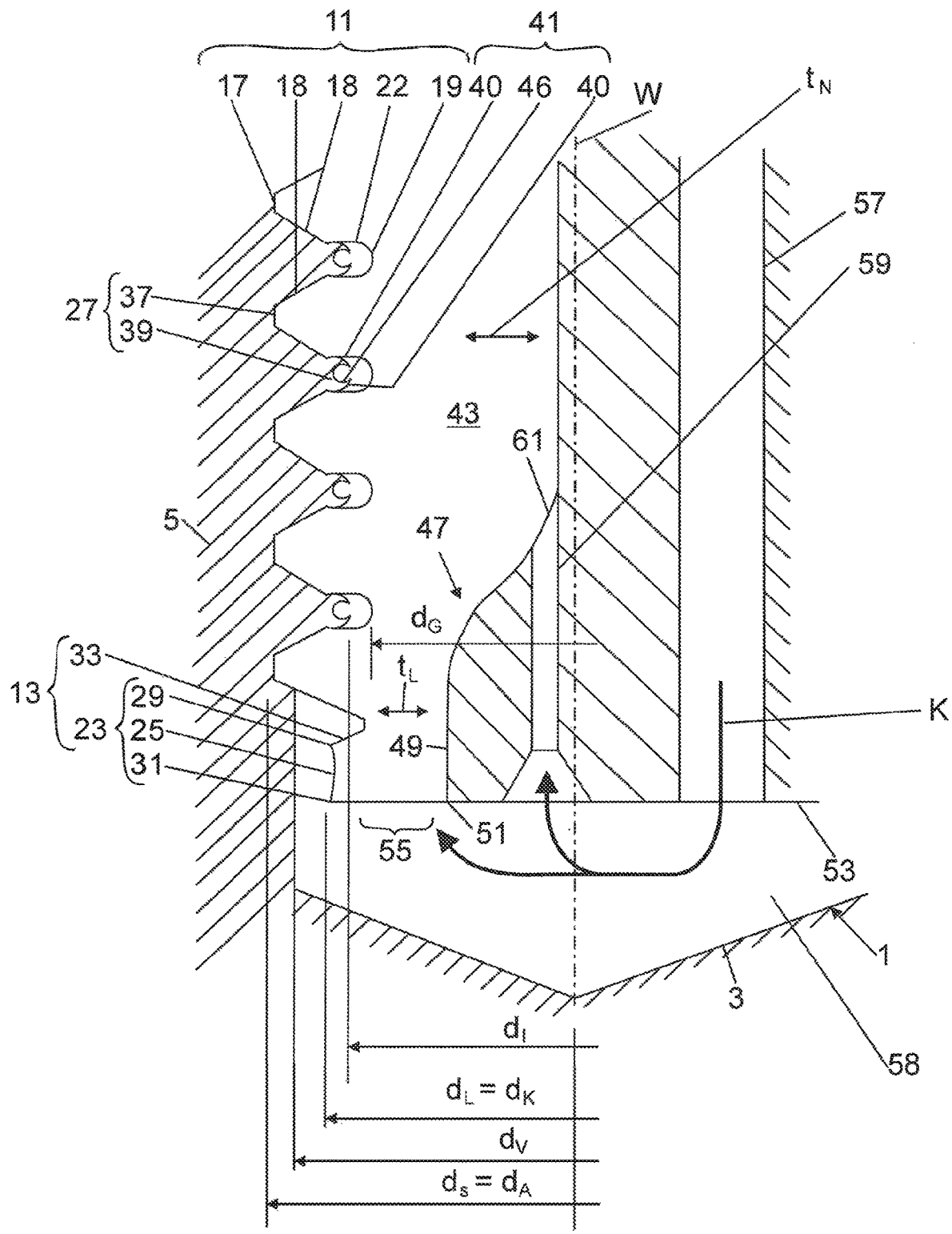
FIG. 13 shows a view according to FIG. 6.

As can also be seen in FIGS. 10 to 13, the chip groove 43 in the drilling section 13 additionally comprises a chip guiding step 47 which partially closes the chip groove 43 in the axial direction. The chip guiding step 47 is used to hold the chips produced in the machining process back from the pilot hole base 3 and to support the chip discharge out of the pilot hole 1. The chip guiding step 47 is formed directly at the tool tip in the FIGS. 10 to 13. Furthermore, the chip guiding step 47 has an end-side chip guiding surface 49, which has a reduced groove depth $t_L$ compared to the groove depth $t_N$ of the chip groove 43 and is radially offset into the tool (FIG. 13).

The chip guiding surface 49 of the chip guiding step 47 converges with a radially outer clearance surface 45 (FIG. 11) to form the longitudinal cutter 23. Viewed in the axial direction, the chip guiding surface 49 transitions at an end-side transition edge 51 into a tool end face 53 (FIG. 12 or 13) which forms the tool tip of the thread shaping tool 9. The end-side transition edge 51 defines a free chip groove opening region 55 (FIGS. 10 to 13) which leads into the tool end face 53.

The thread shaping tool 9 shown in the FIGS. 10 to 13 can be connected to a coolant system. For this purpose, the tool 9 comprises a central cooling duct 57 which extends from the tool clamping shaft 21 towards the tool tip. An outlet duct 59 which has an orifice 61 into the chip groove 43 extends axially parallel to said cooling duct in the tool 9. Both the central cooling duct 57 and the outlet duct 59 lead into the tool end face 53. When shaping a thread in a blind hole, this results in a coolant path K (FIG. 13) where the coolant first flows via the central cooling duct 57 into a space 48 which is formed between the tool tip and the bottom 3 of the hole. Further downstream, the coolant K flows in the opposite direction through the outlet duct 59 into the chip groove 43 to support the chip discharge. In addition, the coolant K flows from the space 58 via the free chip groove opening region 55 into the chip groove 43 to further support the chip discharge. It is of relevance for an effective chip discharge that the flow cross section of the central cooling duct 57 is greater than the overall cross section of the chip groove opening region 55 and the outlet duct 59. In this way, the chips are transported out of the chip groove 43 at a high flow rate by creating a Venturi effect.

The invention claimed is:

1. A tool for producing an internal thread in a workpiece pilot hole comprising:
   a thread major diameter and a thread minor diameter, the tool includes a thread shaping section with which an internal thread profile is produced in a pilot hole wall, which profile has the thread major diameter and a thread inner diameter, wherein the tool includes a drilling section with which the thread inner diameter of the internal thread profile is expanded in a chip machining operation to the thread minor diameter, wherein at least one chip groove is associated with said drilling section of the tool by which chips produced during the expansion of the thread inner diameter to the thread minor diameter are transported away, wherein the drilling section includes at least one longitudinal cutter with a radially outer longitudinal cutting edge, wherein the longitudinal cutting edge extends in the direction of the tool axis between two cutting corners and the longitudinal cutting edge has a radially inwardly bent edge profile by which cut surface edges on the internal thread produced are deburred.

2. The tool according to claim 1, wherein the chip groove extends with a groove length helically or linearly along a tool axis through the thread shaping section and beyond towards a tool clamping shaft.

3. The tool according to claim 2, wherein the drilling section is formed on a tool tip and transitions into the thread shaping section in a direction of a tool clamping shaft, and said drilling section is inserted stress-free into the workpiece pilot hole in a thread shaping stroke and said drilling section expands the internal thread profile by drilling to the thread minor diameter in a subsequent reversing stroke, whereby the internal thread is completed.

4. The tool according to claim 3, wherein the longitudinal cutting edge transitions into a cross cutter at a cutting corner which faces away from the tool tip, and the material is removed in the reversing stroke by the cross cutter and the longitudinal cutter.

5. The tool according to claim 2, wherein said tool includes a central cooling duct which is conducted from the tool clamping shaft towards a tool tip and the central cooling duct is in fluid communication with an outlet duct which leads into the chip groove, such that in the machining process a coolant is guided in the cooling duct to the tool tip and is guided in the opposite direction in the outlet duct from an orifice into the chip groove to support the chip discharge.

6. The tool according to claim 5, wherein both the central cooling duct and the outlet duct lead into a tool end face, when using said tool in a blind hole, to provide a fluid communication between the central cooling duct and the outlet duct, and a flow cross section of the central cooling duct is greater than an overall cross section of the chip groove opening region and the outlet duct.

7. The tool according to claim 1, wherein the thread shaping section includes at least one profile cog having a radially outer profile cog crest crest and a radially inner profile cog base spaced apart from said crest by a cog height, and the profile cog crest is located on a circular line whose diameter is greater than a pilot hole diameter, and in that the profile cog base is located on a circular line whose diameter is smaller than the pilot hole diameter.

8. The tool according to claim 1, wherein the thread shaping section, when viewed in a tool circumference direction, includes circumferentially distributed profile cogs, which are spaced apart from each other by at least one axially extending lubricating groove via which lubricant and/or coolant can be conducted to the profile cogs during thread shaping, and that a chip groove depth is greater than a lubricating groove depth.

9. The tool according to claim 1, wherein the thread shaping section is formed directly on a tool tip and the drilling section is offset from the tool tip by an axial offset, and the drilling section expands the internal thread profile by drilling to the thread minor diameter during a thread shaping stroke and is guided stress-free out of the internal thread in a subsequent reversing stroke.

10. The tool according to claim 1, wherein a thread producing section includes at least two profile cogs in an axial direction, whose cog flanks which face each other form a shaping chamber into which the workpiece material is displaced during shaping of the thread, and a forming chamber transitions radially inwardly into a pocket-shaped recess on a profile bottom, whereby a displacement space for workpiece material that is available during thread shaping is enlarged and the thread inner diameter of a shaped internal thread profile is reduced.

11. The tool according to claim 1, wherein the chip groove at the drilling section includes a chip guiding step, which at least partially closes the chip groove in an axial direction and by said chip guiding step discharge of chips towards the pilot hole in the machining process is prevented and transport of the chips out of the pilot hole is supported.

12. The tool according to claim 11, wherein the chip guiding step is formed directly on a tool tip, and/or the chip guiding step is formed while reducing a chip groove depth to a reduced chip groove depth.

13. The tool according to claim 11, wherein the chip guiding step includes a chip guiding surface, which at the drilling section converges with a radially outer clearance surface, thereby forming the longitudinal cutter, and/or the chip guiding surface transitions into an end face which forms a tool tip at an end-side transition edge.

14. The tool according to claim 13, wherein an end-side transition edge defines a free chip groove opening region, which leads into the tool end face.

* * * * *